United States Patent [19]
Griffith et al.

[11] Patent Number: 5,812,953
[45] Date of Patent: *Sep. 22, 1998

[54] RADIO CELLULAR TELEPHONE FOR REMOTELY INITIATING OPERATION

[75] Inventors: Gregory Clyde Griffith, Atlanta; Richard Allen Guidotti, Snellville; David A. Saitta, Atlanta; Daniel P. Norman, Alpharetta, all of Ga.

[73] Assignee: BellSouth Corporation, Atlanta, Ga.

[ * ] Notice: The term of this patent shall not extend beyond the expiration date of Pat. No. 5,485,505.

[21] Appl. No.: 472,633

[22] Filed: Jun. 7, 1995

Related U.S. Application Data

[62] Division of Ser. No. 156,514, Nov. 23, 1993, abandoned.

[51] Int. Cl.$^6$ ........................................................ H04Q 7/32
[52] U.S. Cl. ............................................................ 455/550
[58] Field of Search ................................. 379/58, 144, 62, 379/61, 91, 63, 112, 59; 455/33.1, 409, 550; 380/9, 21; 235/472; 345/173

[56] References Cited

U.S. PATENT DOCUMENTS

| | | | |
|---|---|---|---|
| 4,268,721 | 5/1981 | Nielson et al. | 379/58 |
| 4,731,818 | 3/1988 | Clark et al. | 379/144 |
| 4,742,560 | 5/1988 | Arai | 455/33.1 |
| 4,776,000 | 10/1988 | Parienti | 379/62 |
| 4,777,646 | 10/1988 | Harris | 379/61 |
| 4,845,740 | 7/1989 | Tokuyama et al. | 379/91 |
| 4,860,336 | 8/1989 | D'Avello et al. | 379/63 |
| 4,935,956 | 6/1990 | Hellwarth et al. | 379/112 |
| 4,951,308 | 8/1990 | Bishop et al. | 379/91 |
| 4,965,821 | 10/1990 | Bishop et al. | 379/91 |
| 4,975,942 | 12/1990 | Zebryk | 379/59 |
| 5,127,641 | 7/1992 | O'Sullivan | 379/59 |
| 5,128,981 | 7/1992 | Tsukamoto et al. | 379/58 |
| 5,195,133 | 3/1993 | Kapp et al. | 380/9 |
| 5,301,223 | 4/1994 | Amadon et al. | 455/409 |
| 5,322,991 | 6/1994 | Hanson | 235/472 |
| 5,325,418 | 6/1994 | McGregor et al. | 455/409 |
| 5,335,276 | 8/1994 | Thompson et al. | 380/21 |
| 5,337,346 | 8/1994 | Uchikura | 379/58 |
| 5,343,494 | 8/1994 | Averst et al. | |
| 5,422,656 | 6/1995 | Allard et al. | 345/173 |
| 5,485,505 | 1/1996 | Norman et al. | 379/58 |
| 5,631,947 | 5/1997 | Wittstein et al. | 379/58 |

FOREIGN PATENT DOCUMENTS

| | | |
|---|---|---|
| 2249459 | 5/1992 | United Kingdom . |

OTHER PUBLICATIONS

Sims Communications, Incorporated, "Instafone", Jan. 1993.

SystemSoft, "What All Too Many Users Say About PC Cards", Jan. 1995.

Lee, "Mobile Cellular Telecommunications", pp. 72 and 73, Jan. 1989.

*Primary Examiner*—William Cumming
*Attorney, Agent, or Firm*—Jones & Askew

[57] ABSTRACT

An apparatus for activating a cellular telephone (10) within a cellular telecommunications network. A PCMCIA card (62) interacts with a controller (50) to display required programming information and questions. A user of the cellular telephone (10) inputs responses to questions on a display (90). The user responses are transmitted to a system administrator at a customer activation center via a mobile telephone switching office in the cellular telecommunications network. The system administrator provides any necessary information for activating the cellular telephone (10). In an alternative embodiment of the invention, a personal computer is connected to cellular telephone (10) and the PCMCIA card (62) is connected to the personal computer. Information for the user may be shown on either the display (90) of the cellular telephone (10) or on a display of the personal computer. The user may input information and responses to questions via a user input device provided as part of the display (90) or as part of the personal computer. User input is provided to the cellular telephone (10) to activate and program the cellular telephone for operation on the cellular telecommunications network.

7 Claims, 5 Drawing Sheets

RADIO CELLULAR TELEPHONE FOR REMOTELY INITIATING OPERATION

This is a division of application Ser. No. 08/156,514, filed on Nov. 23, 1993 now abandoned.

TECHNICAL FIELD

The present invention is an apparatus for activation of a cellular telephone on a cellular telecommunications network, and more specifically is a cellular telephone which accepts a personal computer memory card international association (PCMCIA) card preprogrammed with instructions and questions that guide a user through applying for cellular service, programming and activation of the cellular telephone.

BACKGROUND OF THE INVENTION

In recent years, public use of wireless communication devices has increased greatly. Specifically, the purchase and use of cellular telephones has become commonplace.

Cellular telephones are typically either independently powered hand-held units or are mounted in vehicles. Cellular telephones operate within a government defined frequency range. In recent years, cellular telephones have been manufactured with operating features identical to those found in conventional telephones. Such operating features include storage and recall of numbers in memory, voice mail and call blocking.

Furthermore, very recent cellular telephones have become more intelligent, resembling computers in some aspects. For example, in U.S. Pat. No. 4,868,846, issued to Kemppi, a cellular telephone is locked so that it may only be used by a bearer of a specific programming card. In U.S. Pat. No. 5,220,593, issued to Zicker et al., a system for using a cellular telephone as a credit card paystation is set forth. Additionally, in U.S. Pat. No. 4,965,821, issued to Bishop, an equipment rental system which utilizes a cellular mobile telephone connected to a credit card reader to exchange information required in rental transactions is disclosed. Finally, in Europe, the Global System for Mobile communications (GSM) uses a "smart-card". The smart-card contains information regarding the user in memory and serves as the intelligence of a cellular telephone into which the card is inserted.

A product recently sold in the United States is the Newton by Apple Computer Corp. The Newton is one of a line of products called personal digital assistants (PDAs) that have features such as, for example, handwriting capture devices, and fax/modem devices.

The combination of a computer and a cellular telephone is very powerful. For example, the ability to communicate files, electronic mail and voice with other computers or telephones from anywhere is a convenient and useful tool.

Cellular telephones provide this communication path with other telephones and computers through what are called Mobile Telephone Switching Office(s) (MTSO) and cell sites. Each cell site has a transmitter and receiver to provide communications, such as voice and data, with a cellular telephone while that cellular telephone is in its geographic domain. As is familiar to those skilled in the art, the MTSO tracks and switches a cellular telephone from cell site to cell site as it passes through various cell sites. The cell site sends voice and/or data communications from the cellular telephone to the MTSO, which switches the call to a destination in a manner well known to those skilled in the art. The connection between cell sites and a MTSO may be wireless or hard-wired. The plurality of MTSOs and cell sites together form a cellular telecommunications network.

A cellular telephone is monitored, tracked and serviced by the MTSO that controls the cell within which the cellular telephone is physically located. When a cellular telephone physically passes from one cell to another cell, the MTSO for the corresponding cells performs a "hand-off" that allows the cellular telephone to be continually serviced. Likewise, in some cellular telecommunications networks, a cellular telephone can be handed-off when it passes from the domain of a first MTSO into the domain of a second MTSO.

Because of their mobility, devices incorporating cellular telephones must be light and compact. A user needs to be able to comfortably carry the cellular telephone in a pocket, purse or briefcase. To meet these requirements, cellular telephones typically have a minimum number of user input and display output devices. Limitation of user input and display output devices reduces the size and weight of cellular telephones. For example, it is common for a cellular telephone to have only a liquid crystal display (LCD), a numeric keypad, a very limited number of control buttons, such as a clear/end button, a send button and a power button. A personal digital assistant incorporating a cellular telephone might include a touch sensitive or pen-based screen in addition to the above list of user-interface devices.

As can be gathered from the above, cellular telephones are complex and expensive units. The complexity of cellular telephones is reflected in the time and expertise required for initiating operation of a cellular telephone on a cellular telecommunications network. The limited user input and display output devices in cellular telephones preclude the typical end user from programming the cellular telephone.

In the past, the needs to provide a trained individual to initiate operation of the cellular telephone on the cellular telecommunications network, to ensure the credit-worthiness of the user, and to provide the user with options regarding programming and use of the cellular telephone, such as rate and payment plan options, have converged into a single solution. Specifically, a "sales representative" or "customer service representative" was employed to:

(1) gather personal and financial information pertaining to the user, (2) initiate a credit check on the user, (3) present and explain options concerning custom call features and enhanced service options, such as call waiting, and rate and payment plans, (4) accept a deposit from the user, (5) contact a system administrator in a customer activation center to activate the cellular telephone in the cellular telecommunications network, and (6) program the cellular telephone or arrange for a technician to program the cellular telephone.

Until now, the sales representative or customer service representative had to quiz the user regarding various personal and financial information, fill out forms regarding the user, send this information to the system administrator for the cellular telecommunications network, await a response from the administrator in the customer activation center (CAC), and program the cellular telephone or arrange for programming of the telephone by a technician.

Typically, the provider of services on the cellular telecommunications network pays a commission to its distribution channels for finding a customer and for performing these tasks. Distribution channels are familiar to those in the cellular industry field, including sales agents, retailers, etc. It typically requires at least thirty minutes for a customer service representative to sign up a new customer and get the cellular telephone activated and programmed. Retailers charge a very large commission for the provision of these services by their employees. Therefore, a large expense incurred in the provision of cellular services to users is directly attributable to commissions paid to customer service representatives.

There has been an attempt to facilitate and expedite the provision of cellular telephones and services to users. In U.S. Pat. No. 4,958,368, issued to Parker, a customer service representative logs onto a system comprising a terminal connected via a standard data communications link to a "regional processor" that is dedicated to activating cellular telephones. The customer service representative enters an ID number and other information necessary to access the system. The customer service representative inputs the user's social security number to a regional processor which derives information about the customer based upon the user's social security number. The central processor then gets credit approval and provides a credit report to the customer service representative. The regional processor then activates a number for the cellular telephone in the cellular telecommunications network. The Parker patent does not address programming the cellular telephone.

However, as set forth in the Parker patent, a trained customer service representative must still be involved in gathering information concerning the user. Furthermore, a dedicated network must be built and maintained to interact with the customer service representative. Finally, the customer service representative or a trained technician must presumably be engaged to program the cellular telephone for operation.

Another patent, U.S. Pat. No. 5,109,403, issued to Sutphin, discusses programming certain specific features of a mobile cellular telephone from a MTSO. However, the programming of features disclosed in Sutphin is done after the cellular telephone has been activated on the cellular telecommunications network, and involves only ancillary features to operation such as repertory memory storage and call-in absence indicators controlled by software switches in the cellular telephone.

Thus, despite the above cited advances in cellular telephones and the interactions between the users of cellular telephones and other computers, the prior art does not disclose a way of automating the application for cellular service, programming of a cellular telephone and activating of a cellular telephone on a cellular telecommunications network.

Therefore, it would be desirable to have an apparatus for automating application for cellular service, the sale and programming of cellular telephones and, more specifically, for providing the information necessary for a customer to use a cellular telephone on a cellular telecommunications network to a system administrator without assistance from a sales representative, a customer service representative or a technician.

SUMMARY OF THE INVENTION

The present invention is a cellular telephone that facilitates the initialization and programming necessary for using the cellular telephone on a cellular telecommunications network. Generally described, the cellular telephone of the present invention interacts with a user to prompt for and accept responses necessary for establishing the credit-worthiness of a buyer. The information about the user is sent by the cellular telephone to a mobile telephone switching office (MTSO) where it is relayed to a system administrator who can review the information and approve activation of the cellular telephone on the cellular telecommunications network. The user of the cellular telephone is then provided with the information necessary to program the cellular telephone for operation on the cellular telecommunications network.

More specifically described, a personal computer memory card international association (PCMCIA) card is provided to the user who purchases or rents a cellular telephone. The PCMCIA card is preprogrammed with a series of questions. The PCMCIA card is inserted into a corresponding PCMCIA slot in the cellular telephone. At start-up, the controller in the cellular telephone reads the questions on the PCMCIA card and displays those questions to the user via the display on the cellular telephone. The questions concern rate plan options, choice of a long distance carrier, the personal and financial information necessary for a credit check, as well as the terms and conditions of a contract for cellular service. In the preferred embodiment of the present invention, the user responds to the series of questions via a pressure-sensitive video screen on the cellular telephone.

In the present invention, a signature capture device is incorporated into the pressure-sensitive video screen in the cellular telephone. The PCMCIA card contains an instruction requesting the user to sign his or her name to indicate approval of a credit check and acceptance of the terms and conditions of a contract for cellular service should the user's credit be acceptable. The signed name is digitized and stored with the responses to other questions.

When the user has responded to all questions provided by the PCMCIA card, instructions are provided by the PCMCIA card on the display for sending the responses to the customer activation center (CAC) via the MTSO servicing that cellular telephone. All cellular telephones can directly dial and communicate with the provider of cellular services via a preassigned telephone number if the cellular telecommunications network is configured for such operation. Thus, the responses to the questions are sent via this dedicated number to the provider of cellular services operating the cellular telecommunications network. The information may either be provided to a personal computer or other data terminal where it can be displayed, or the information can be provided via facsimile. The system administrator then performs any needed background and credit checks.

Typically, cellular telephones have a preassigned electronic serial number (ESN) preprogrammed in read only memory (ROM). The ESN uniquely identifies the telephone to the system administrator at the customer activation center. In an alternative embodiment of the present invention, both the cellular telephone and the PCMCIA card provided with the cellular telephone are preprogrammed with the ESN. The ESN is stored in the PCMCIA card for purposes of activating the cellular telephone. The user of the cellular telephone need not look in a manual provided with the cellular telephone to find the ESN or type in the ESN for transmission to the customer activation center. The ESN is automatically sent to the customer activation center with the responses to the questions via the MTSO so that the cellular telephone can be identified and activated in the cellular telecommunications network. This prepares the cellular telecommunications network for monitoring and servicing the cellular telephone. Further operations, such as activating billing, are also performed in the customer activation center.

Once the above operations are complete, the mobile identification number (MIN) is assigned to the cellular telephone and the cellular telephone is activated in the cellular telecommunications network, an acknowledgment signal is sent by the provider of the cellular services via the MTSO to the user of the cellular telephone. The cellular telephone and customer activation center remain connected during the activation procedure via the original call from the cellular telephone. Also, the MIN, which is the telephone number for the cellular telephone, is sent to the cellular telephone by the system administrator via the MTSO. After the cellular telephone receives the acknowledgment signal and MIN number from the MTSO, the PCMCIA card provides the user with a series of instructions that guide the user through activating the cellular telephone for operation on the cellular telecommunications network.

In an alternative embodiment of the present invention, the cellular telephone has an RJ-11 jack and is connected to the customer activation center via the Public Switched Telephone Network (PSTN). The RJ-11 jack may be on the PCMCIA card that is inserted in the cellular telephone.

The present invention is a PCMCIA card for use with a cellular telephone, and comprises a connector for connecting the PCMCIA card to the cellular telephone, and has preprogrammed questions concerning the name of the user, preprogrammed questions concerning the address of the user, preprogrammed questions concerning financial information about the user, preprogrammed information concerning operation of the cellular telephone, and preprogrammed information concerning programming of the cellular telephone.

The present invention is also a cellular telephone for use in a cellular telecommunications network of the type having a customer activation center, and comprises a memory device containing preprogrammed questions, a display for providing the questions to a user of the cellular telephone, an input device for accepting responses from the user to the questions, means for providing the responses to the customer activation center, means for receiving information from the customer activation center, and a controller connected to the memory device, the input device, the display, the means for receiving information and the means for providing the responses, to control provision of the questions and the information to the user, acceptance of the responses, transmission of the responses to the customer activation center, and use of the information to program the cellular telephone for operation on the cellular telecommunications network. In the preferred embodiment of the present invention, the memory device is a PCMCIA card. In the preferred embodiment of the present invention, a transmitter and receiver in the cellular telephone support communication with the customer activation center via a MTSO.

Those skilled in the art will recognize that the present invention provides a method for programming a cellular telephone for operation on a cellular telecommunications network of the type having a customer activation center, and comprises the steps of retrieving questions from a memory device, displaying the questions to a user of the cellular telephone, accepting responses to the questions from the user, sending the responses to the customer activation center using the cellular telephone, and using the cellular telephone to receive information from the customer activation center for programming the cellular telephone to operate on the cellular telecommunications network.

In an alternative embodiment of the present invention, the cellular telephone automatically hangs up or instructs the user to hang up after transmitting the file containing the responses and signature to the customer activation center.

Subsequently, and instead of sending an acknowledgement signal to the cellular telephone, a system administrator calls the user of the cellular telephone. The system administrator calls the cellular telephone via a preassigned or "dummy" MIN number and orally tells the user the instructions necessary for programming the cellular telephone. The dummy number is a temporary telephone number that enables the system administrator to call the new cellular telephone. The user then keys in the specified numbers, including the new MIN that is programmed over the dummy number. The dummy MIN number may be preprogrammed into the cellular telephone or in the PCMCIA card. This embodiment of the invention requires coordinating the provision of the dummy MIN number(s) with manufacturers of cellular telephones so that the dummy MIN number(s) can be assigned and programmed in the cellular telephones or in the PCMCIA cards during manufacturing.

In another alternative embodiment of the present invention, the cellular telephone has an input/output data port, such as a serial port, and is thereby connected to a personal computer via a hard-wire connection. A PCMCIA card or a floppy disk is preprogrammed with the questions and instructions necessary to program and activate operation of the cellular telephone, as discussed above. The PCMCIA card or floppy disk is read by the personal computer. The user views the questions on the personal computer display and responds to the questions using the keyboard associated with the personal computer. A signature capture device is located on the personal computer display, or on the cellular telephone display. The responses to the questions and the user's signature are communicated from the personal computer to the customer activation center through the cellular telephone and the MTSO, or alternatively through the cellular telephone and the PSTN. The personal computer is also used to program the cellular telephone. Instructions for programming the cellular telephone are shown on the display and programming data is entered by the user via the keyboard.

This embodiment of the present invention is a cellular telephone for use in a cellular telecommunications network of the type having a customer activation center and for use with a personal computer which includes a memory device containing preprogrammed questions, and comprises a connector for connecting the cellular telephone to the personal computer, a display for providing the questions to a user of the cellular telephone, an input device for accepting responses from the user to the questions, means for providing the responses to the customer activation center, means for receiving information from the customer activation center, and a controller connected to the personal computer, the input device, the display, the means for receiving information and the means for providing the responses, to control provision of the questions and the information to the user, acceptance of the responses, transmission of the responses, to the customer activation center and use of the information to program the cellular telephone for operation on the cellular telecommunications network.

Alternatively, the present invention is a cellular telephone for use in a cellular telecommunications network of the type having a customer activation center and for use with a personal computer including a display, and comprises a memory device containing preprogrammed questions, a connector for connecting the cellular telephone to the personal computer, an input device for accepting responses from a user to the questions, means for providing the responses to the customer activation center, means for receiving information from the customer activation center, and a controller connected to the memory device, the input device, the personal computer through the connector, the means for receiving information and the means for providing the responses, to control provision of the questions and the information to a user via the display, acceptance of the responses, transmission of the responses to the customer activation center, and use of the information to program the cellular telephone for operation on the cellular telecommunications network.

Alternatively, the present invention is a cellular telephone for use in a cellular telecommunications network of the type having a customer activation center and for use with a personal computer which includes an input device, and comprises a memory device containing preprogrammed questions, a display for providing the questions to a user of the cellular telephone, a connector for connecting the cellular telephone to the personal computer, means for providing the responses to the customer activation center, means for receiving information from the customer activation center, and a controller connected to the memory device, the personal computer through the connector, the display, the means for receiving information and the means for providing the responses, to control provision of the questions and the information to the user, acceptance of the responses from the user via the input device, transmission of the responses to the customer activation center, and use of the information to program the cellular telephone for operation on the cellular telecommunications network.

Thus, it is an object of the present invention to provide a cellular telephone that obtains personal and financial information from a purchaser of a cellular telephone without requiring a sales representative or customer service representative to gather information from the purchaser and provide the information to a system administrator in the customer activation center for the cellular telecommunications network.

It is a further object of the present invention to provide a cellular telephone that transfers personal and financial information from a purchaser of a cellular telephone to a customer activation center.

It is a yet another object of the present invention to facilitate programming of a cellular telephone by the user of the cellular telephone That the present invention accomplishes these objects and overcomes the above cited drawbacks of the prior art will be apparent to those skilled in the art from the detailed description in the preferred embodiment to follow.

DETAILED DESCRIPTION OF THE DRAWINGS

Figure 1:
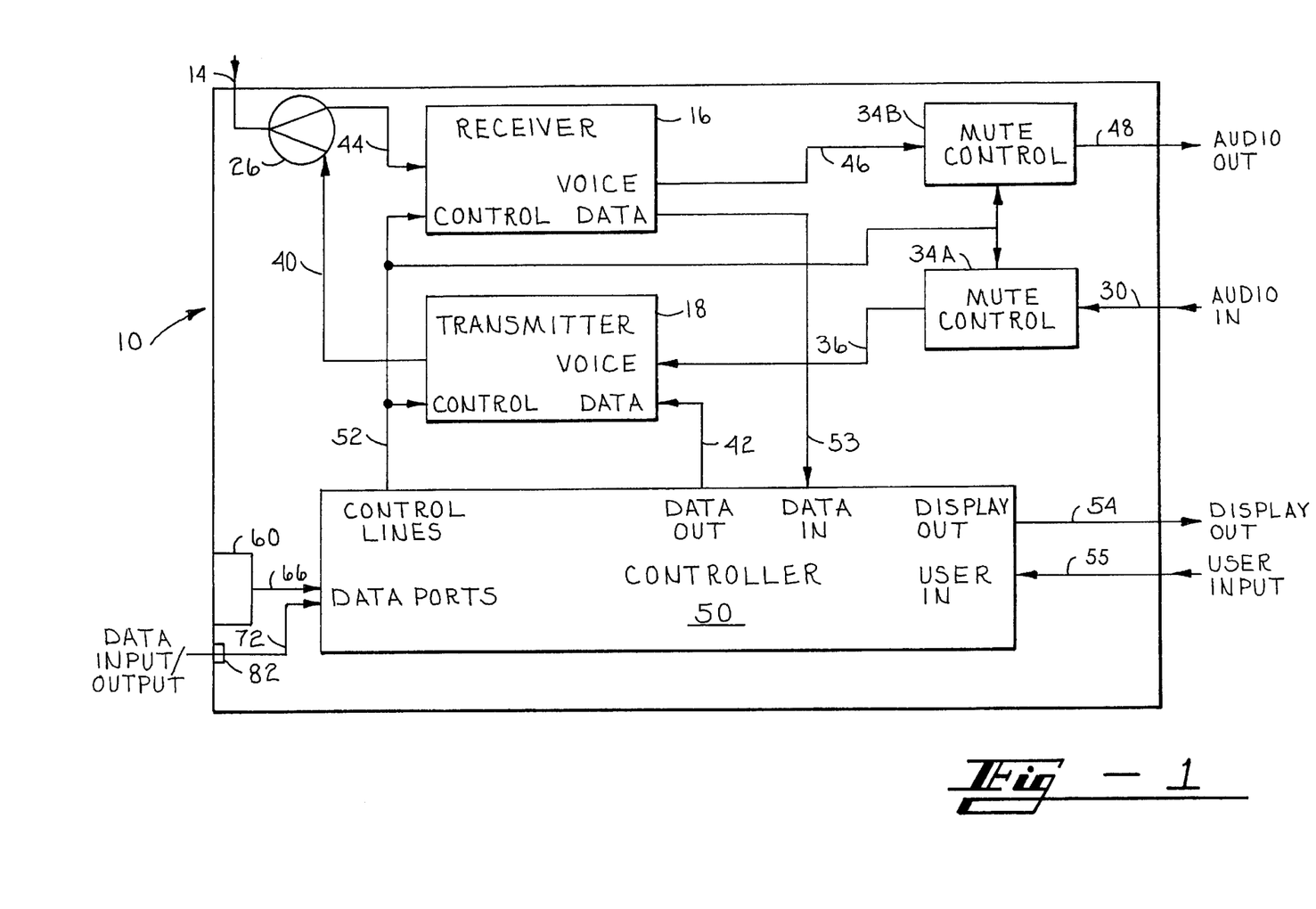
FIG. 1 is a block diagram of the circuitry in the cellular telephone in the preferred embodiment of the present invention.

Turning next to the figures in which like numerals indicate like parts, the preferred embodiment of the present invention will now be described. FIG. 1 is a block diagram of the cellular telephone 10 in the preferred embodiment of the present invention. The cellular telephone 10 has an antenna 14, a receiver 16 and a transmitter 18 for communicating with a Mobile Telephone Switching Office (MTSO) 20 (FIG. 2), and a controller 50 for controlling the operation of the cellular telephone 10. Controller 50 comprises a microprocessor, a random access memory (RAM), and some type of read only memory (ROM), not shown separately. Those skilled in the art will recognize that the cellular telephone 10 may be any of a wide variety of wireless personal communication devices, including personal communicators and personal digital assistants which have cellular telephone capability.

Figure 2:
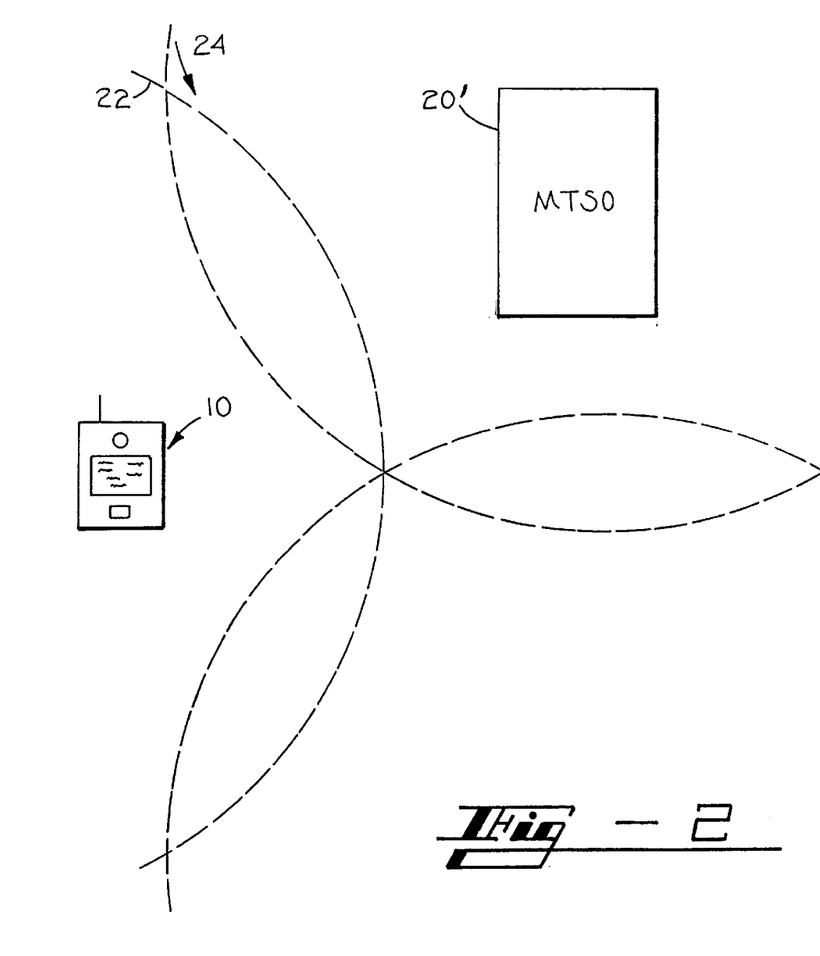
FIG. 2 is a diagram of a cellular telephone in communication with a customer activation center via a mobile telephone switching office.

The receiver 16, transmitter 18, antenna coupler 26 and antenna 14 communicate with a MTSO 20 (FIG. 2). Specifically, an audio input 30 such as a microphone 32 (FIG. 4) carries voice input from a user through a mute control 34A into transmitter 18. The mute control 34A is an on/off switch used to control when voice provided by the microphone 32 is passed to transmitter 18, and is familiar to those skilled in the art. Mute control 34A is controlled by controller 50 via control bus 52. The mute control 34A selectably passes audio input to transmitter 18 via line 36. The transmitter 18 modulates the voice onto a carrier, in a manner well-known to those skilled in the art, and passes the voice-modulated signal to the antenna coupler 26 on line 40.

The antenna coupler 26 is a duplexer for full-duplex telephone 10 operation, as is well-known to those skilled in the art. Modulated signals, such as voice or data, are output from the antenna coupler 26 to antenna 14. The mute control 34A, transmitter control 18, antenna coupler 26 and antenna 14 are devices well-known to those skilled in the art. Furthermore, connection of these devices to transmit voice and data signals is well-known to those skilled in the art.

In addition to the conventional voice signals typically associated with cellular telephones 10, protocols such as the cellular digital packet data (CDPD) protocol support the transmission of digital signals from and to cellular telephones. Typically, there are both voice and digital data channels in such a cellular telecommunications network 24.

With the availability of modems in today's cellular telephones 10 and of digital data communications paths, computer files, electronic mail and digitized data can be sent from, and to, cellular telephone 10. Digitized data intended for transmission from the cellular telephone 10 may be received from another computer or device on data input/output port 82, from device reader 60 or from ROM (not shown) in the cellular telephone 10. The digitized data is passed from controller 50 to transmitter 18 on line 42. The transmitter 18 modulates the carrier in accordance with the digitized data for transmission in a manner well-known to those skilled in the art. The digitized data is passed from transmitter 18 to antenna coupler 26 via line 40, and from coupler 26 to antenna 14. Thus, audio and digitized data may both be transmitted from the cellular telephone 10 via antenna 14.

The cellular telephone 10 receives modulated signals, such as analog voice and digitized data signals, on antenna 14. The signals received on antenna 14 are passed through antenna coupler 26 to receiver 16 via line 44. Demodulation of the modulated signals is performed in receiver 16. Voice signals are output from receiver 16 to mute control 34B via line 46. The controller 50 controls receiver 16 and mute control 34B via control bus 52 to output the received audio signals on audio output line 48. A speaker 49 (FIG. 3) receives the signals on audio output line 48.

Digitized data signals are passed on line 53 to controller 50. The controller 50 outputs the digitized data on display out line 54, or to data input/output port 82, or performs other functions with the digitized data. The receipt, demodulation and processing of voice and digitized data through receiver 16 are well-known to those skilled in the art.

FIG. 2 is a diagram of cellular telephone 10 in communication with a MTSO 20. In the preferred embodiment of the present invention, the MTSO 20 is connected via line 25 to a customer activation center 23. As is familiar to those skilled in the art, the MTSO 20 tracks and switches cellular telephone 10 as it passes through various cell sites under the control of that MTSO 20. The cell sites contain the transmitters and receivers that communicate voice and data signals directly to and from the cellular telephone 10.

The MTSO 20 controls a finite number of cell sites and therefore has a geographic range for tracking and monitoring cellular telephones, as indicated by the dashed line 22. As long as the cellular telephone 10 remains within the range demarcated by the dashed line 22, it communicates through the MTSO 20. As is familiar to those skilled in the art, when the cellular telephone 10 is physically located outside the range of the MTSO 20 marked by dashed line 22, another MTSO 20', having control over another set of cell sites, tracks and services the cellular telephone 10. A series of MTSOs, 20, 20' etc., comprises a cellular telecommunications network 24.

The components and operating specifications of the MTSO 20 and cellular telecommunications network 24 can vary, as will be obvious to those skilled in the art. For example, the cellular telephone 10 of the present invention could operate using the personal communications services (PCS) standard promulgated by the Federal Communications Committee (FCC). In an alternative example, the cellular telephone 10 of the present invention could operate using the Specialized Mobile Radio (SMR) network standard or the Enhanced Specialized Mobile Radio (ESMR) network standard promulgated by the FCC. The term MTSO 20, as used herein, incorporates any element or combination of elements that service wireless communications devices, such as cellular telephone 10.

When a cellular telephone 10 is first purchased it has not been authorized to communicate with other telephones. The cellular telephone 10 will be able to provide few, if any, functions for the user until it has been programmed and activated on the cellular telecommunications network 24. To perform such a task in accordance with the present invention, the user must be provided with instructions and questions, must answer questions, must be able to send the answers or responses to the MTSO 20 and must program the cellular telephone 10.

Figure 3:
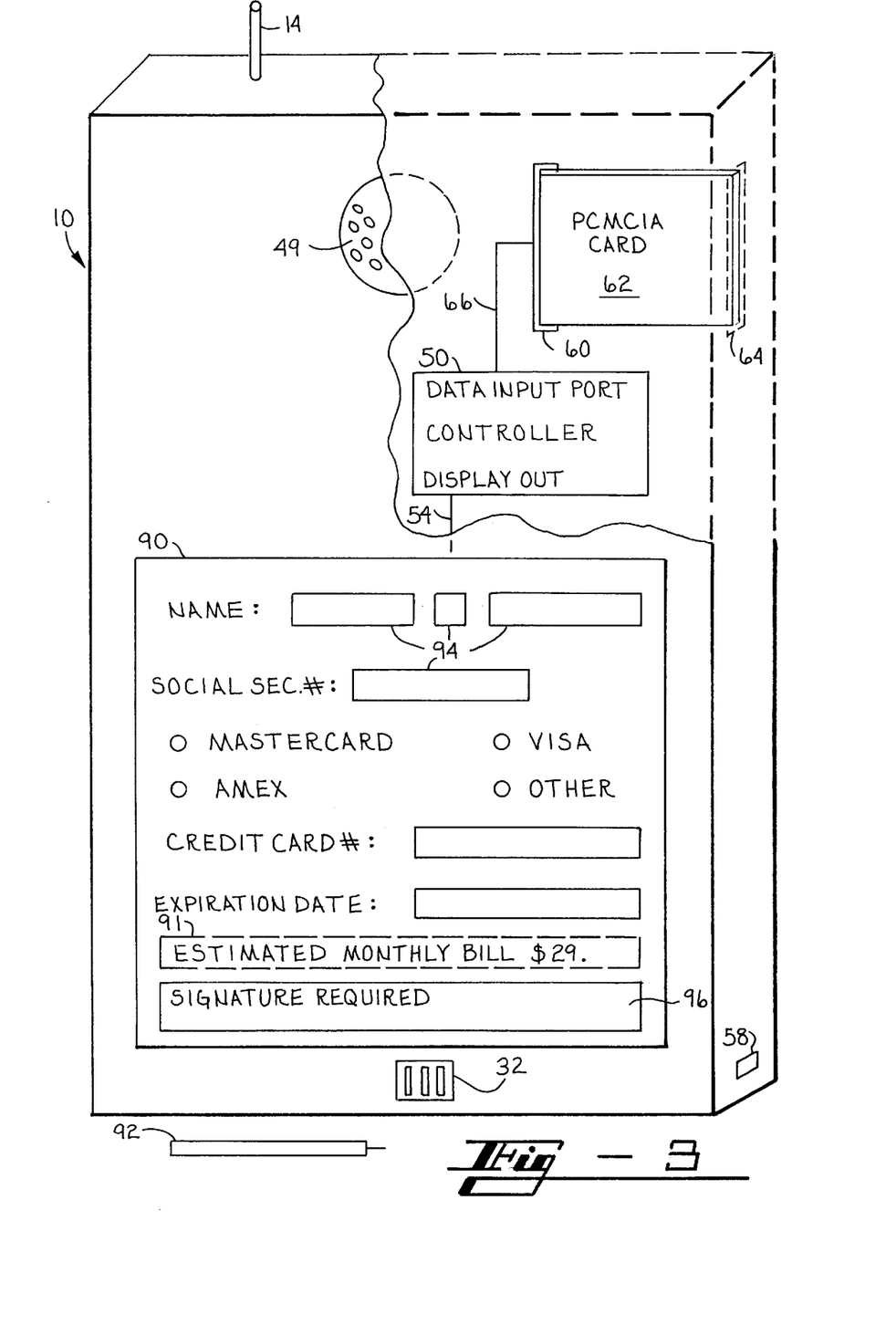
FIG. 3 is a front perspective view of the display and a cut-out of the memory device in the preferred embodiment of the present invention.

FIG. 3 is a front perspective view of the preferred embodiment of the present invention wherein a memory device is connected to a device reader 60 in the cellular telephone 10. In the preferred embodiment of the present invention, the memory device is a personal computer memory card international association (PCMCIA) card 62, familiar to those skilled in the art. The PCMCIA card 62 is received in a corresponding slot 64 containing a card connector 60.

When first using the cellular telephone 10, the user inserts PCMCIA card 62 into slot 64. The PCMCIA card 62 is preprogrammed with a program 100 (FIG. 5) for activating and programming the cellular telephone 10. Controller 50 reads the program 100 and associated data via line 66 and executes the program. In the following discussion, refer also to FIG. 5, which is a flow chart of the program 100 stored in the PCMCIA card 62 and executed by the cellular telephone 10 in the preferred embodiment of the present invention.

Figure 5:
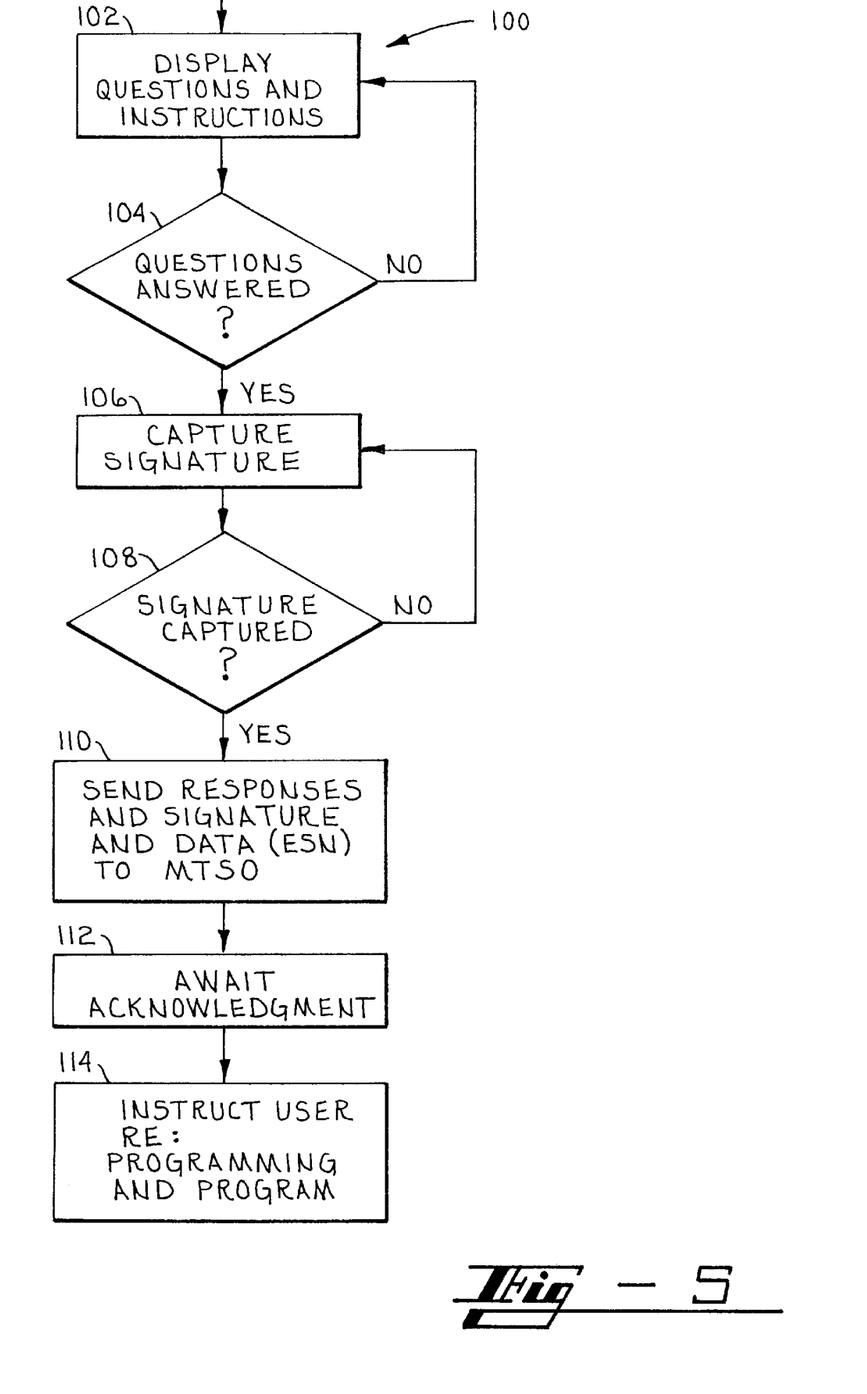
FIG. 5 is a flow chart of the program stored in the memory device and executed by the cellular telephone in the preferred embodiment of the present invention.

The program 100 includes a series of questions, choices, or instructions to be output on display 90 at step 102. The items shown on display 90 in FIG. 3 are exemplary, but are not exhaustive and the actual items are a matter of discretion and government regulation. For example, information and questions included at step 102 and output on display 90 concern the user's name and address, a rate plan, custom call features, enhanced service selections and a long distance carrier.

The PCMCIA card 62 also provides information to the user to guide the user in responding to the questions shown on display 90. For example, as seen on display 90 in FIG. 3, after the user has selected a rate plan the PCMCIA card 62 and/or controller 50 calculate an estimated monthly bill as shown by box 91. This information is provided for the user based on the user's responses to questions concerning frequency of use of the cellular telephone 10 and the rate plan chosen. The user can utilize this information to change responses to the questions on display 90.

In the preferred embodiment of the present invention, the user responds to questions on display 90 using a stylus 92 applied to pressure-sensitive regions 94 that are demarcated by lines on display 90. This is shown at step 104 in FIG. 5. Display 90 is a pressure sensitive liquid crystal display such as is set forth in U.S. Pat. No. 5,120,906, issued to Protheroe et al., and disclosed in U.S. Pat. No. 5,195,133, issued to Kapp et al. Those skilled in the art will recognize that any of a number of electromagnetic interactive, linear beam interactive, electrolinear, touch resistive or touch sensitive screens or displays may be utilized in the present invention. The controller 50 provides data to the display device 90 via line 54 and receives the user input via line 55.

The handwritten responses on display 90 in regions 94 are digitized in step 104 for later transmission to the system administrator. The responses are digitized for facsimile transmission, and stored in a file pending facsimile transmission of the responses to the system administrator. Alternatively, the handwritten responses may be converted to text and stored in a file. Handwriting to text converters are familiar to those skilled in the art and include the Newton Script handwriting recognition software sold with the Newton product by Apple Computer, Inc., the "GO" handwriting recognition software sold with the EO personal communicator manufactured by EO, Inc., and the "PalmPrint" handwriting recognition software sold with the Zoomer, manufactured by Tandy Corp.

A signature capture region 96 is also provided on display 90 for purposes of conducting a credit check. By law a credit check can only be performed if a person provides a signature of consent. Further, the provision of cellular services to a user often is under a contract, and the user's assent to the contract is indicated by his or her signature. The user signs his or her name on display 90 using stylus 92 and the signature is captured as set forth above and indicated by step 106 in program 100. Of course, this signature is not converted to text. The signature in the signature capture region 96 is digitized for later transmission as a facsimile item to the system administrator and stored in a file with the responses. The controller 50 awaits the input of a signature by the user at steps 106 and 108 in program 100 (FIG. 5).

When the user has responded to all the questions provided by PCMCIA card 62 on display 90, a "send" icon (not shown) appears on display 90, as set forth at step 110 in FIG. 5. By depressing the "send" icon, the user causes the telephone 10 to send the responses to the questions and the signatures in the file to the system administrator via the local MTSO 20.

An unprogrammed and not activated cellular telephone 10 cannot, in general, conduct communications. However, in the preferred embodiment of the present invention, controller 50 is preprogrammed via its ROM or PCMCIA card 62 to allow the user to call the system administrator in the customer activation center 23 via the MTSO 20 so as to obtain programming and/or authorization. The user calls the customer activation center 23 via telephone 10 and a MTSO 20 by dialing a preassigned number. The preassigned number might be, for example, a three digit number, a seven digit local number, a toll-free eleven digit long distance number, or a three digit number preceded by an asterisk, such as "*611", commonly used in many cellular telecommunication networks 24 for providing information or services to non-registered users.

All calls to the preassigned number are switched by the MTSO 20 and the public switched telephone network (PSTN) 59 to the customer activation center 23, which has one or more system administrators for receiving the responses and signatures, and approving or disapproving access to the cellular telecommunications network 24. Each cellular telephone 10 is uniquely identified in the customer activation center 23 by the electronic serial number (ESN) that is preprogrammed in the telephone 10 and sent to the customer activation center 10. The customer activation center 23 includes a computer (not shown), which is a UNIX-based computer in the preferred embodiment of the present invention. The file or facsimile containing the digitized responses and signature is transmitted to the customer activation center 23 via the MTSO 20.

The incoming call at the customer activation center 23 is identified as a customer activation request because the preassigned number dialed by telephone 10 is dedicated to customer activation. Thus, for example, the preassigned number could connect to a facsimile machine or a computer (not shown) in the customer activation center 23 that would receive and print or display the user's information. The information would be directed to a system administrator who would review the information, perform a credit check, assign a MIN to the user, etc.

The responses and signature transmitted from cellular telephone 10 via MTSO 20 are preferably printed on a facsimile machine in the customer activation center 23. Those skilled in the art will be familiar with the digitization of responses and signature necessary for type 3 facsimile transmissions. The information contained in the facsimile is keyed into the computer at the customer activation center 23, and used by the system administrator in the customer activation center 23 to generate a credit check.

In an alternative embodiment of the present invention, the PCMCIA card 62, provided to the user with the cellular telephone 10, is also preprogrammed with the unique electronic security number (ESN) that is preprogrammed in the cellular telephone 10. Because the ESN is provided in the PCMCIA card 62, the user need not find and enter the ESN for activation of the cellular telephone 10. The ESN is automatically transmitted to the system administrator in the customer activation center 23 when the user sends the responses via the MTSO 20, as seen at step 110 in program 100.

Alternatively, to contact the customer activation center 23, the PCMCIA card 62 may cause the display of an instruction commanding the user to attach a telephone line to the RJ-11 jack 58 in the cellular telephone 10 (FIG. 3). Many cellular telephones have an RJ-11 jack 58, or can be connected to a PCMCIA card 62 that includes an RJ-11 jack 58. After connecting a telephone line to the RJ-11 jack 58, the user is instructed to push the send icon. Thus, the responses and signature are communicated to the customer activation center 23 via the public switched telephone network (PSTN) 59.

Alternatively, in another embodiment of the present invention, the MIN number is not preprogrammed in the cellular telephone 10 or in PCMCIA card 62. In this case, the MIN number is generated at the customer activation center 23 and sent back to the cellular telephone 10 via either the appropriate MTSO 20 or the PSTN 59. In this embodiment, the cellular telephone 10 is preprogrammed with a dummy MIN number. A dummy MIN, along with the preprogrammed ESN, enables the telephone 10 to be called and/or to call the system administrator. Thus, the user of the cellular telephone 10 can hang up after sending the responses to the customer activation center 23 and wait for a call back using the dummy MIN. After a credit check has been performed and the creditworthiness of the user confirmed, the telephone 10 will be given a unique permanent MIN generated at the customer activation center 23. Those skilled in the art will recognize that other information necessary or desirable in different cellular telephones 10 or cellular telecommunications networks 24 can be communicated between the customer activation center 23 and the user of the cellular telephone 10.

In the preferred embodiment of the present invention, after the responses and signature are transmitted to the customer activation center 23, necessary ministerial functions are performed by the system administrator and the support staff. A credit check is conducted, a billing file is opened and, if necessary, the amount of the deposit required from the user is calculated. If a deposit is required, the amount of the deposit is transmitted to the cellular telephone 10 and shown on display 90. Because the credit card number and expiration date were already obtained at step 104 in the program 100, the user is typically only asked to provide another signature authorizing the credit payment.

After the cellular telephone 10 has sent the responses and signature to the customer activation center 23 it awaits a response. The controller 50 awaits the acknowledge signal at step 112 in program 100. After an acknowledge signal is received at step 112, the controller 50 reads the PCMCIA card 62 to obtain and output instructions for programming the cellular telephone 10 on display 90. The programming of cellular telephone 10 is shown as step 114 in FIG. 5. Programming the cellular telephone 10 includes inputting a security code sequence to put the telephone 10 into the programming mode, entering the permanent MIN number, group identification number, setting a lock code and setting specialized features (i.e.—hands-free operation). This information is programmed in a memory device, such as read only memory, random access memory, or electrically programmable read only memory, that is a part of controller 50 in the cellular telephone 10. The information is entered via pressure-sensitive display 90 and handwriting to text conversion set forth above or by depressing icons (not shown) on display 90 representing numbers.

In an alternative embodiment of the present invention, after the responses and signature are provided, the program 100 can cause controller 50 to hang up or to instruct the user to hang up cellular telephone 10. The user then receives a message on display 90 stating that a system administrator will be calling. The system administrator calls via a preassigned dummy MIN telephone number to discuss the responses with the user, to give the user a permanent unique MIN and to instruct the user how to program the cellular telephone. Alternatively, the user may provide a home or work telephone number and the RJ-11 jack (FIG. 3) of telephone 10 could be connected to the PSTN 59 at the number to await the call back. Those skilled in the art will recognize many ways for the customer activation center 23 to contact the telephone 10 via the MTSO 20 or PSTN 59.

Those skilled in the art will recognize several alternative embodiments to the above-described invention. The PCMCIA card 62 may be replaced with a floppy disk or other suitable memory device. Of course, the device reader 60 (FIG. 1) in the cellular telephone 10 must correspond to the chosen memory device.

Alternatively, the program 100 in the PCMCIA card 62 in the preferred embodiment of the present invention could be programmed into the read only memory (ROM) chip (not shown) which is considered to be part of controller 50 of the cellular telephone 10. As will be familiar to those skilled in the art, the ROM chip is directly accessed by a microprocessor (not shown), also a part of controller 50, and the information contained therein displayed in a manner similar to the use of the PCMCIA card 62 set forth above.

Figure 4:
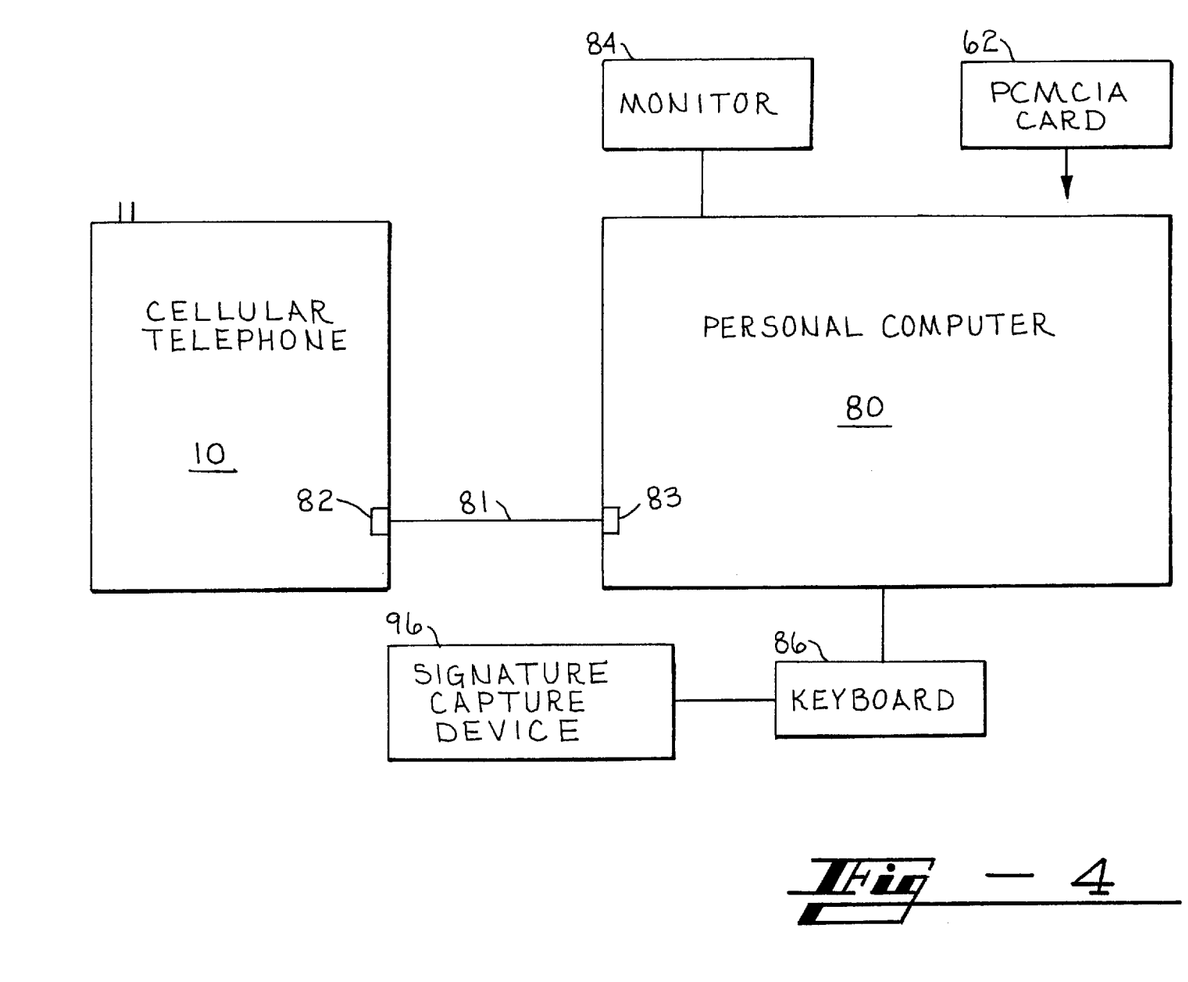
FIG. 4 is a diagram of a cellular telephone connected to a personal computer in an alternative embodiment of the present invention.

Refer now to FIG. 4. FIG. 4 is a diagram of a cellular telephone 10 connected to a personal computer 80 in another alternative embodiment of the present invention. In this alternative embodiment of the present invention, the data input/output port 82 of the cellular telephone 10 is connected to a data input/output port 83 of personal computer 80 via connector cable 81. Preferably, ports 82 and 83 are serial data ports. Those skilled in the art will recognize that the personal computer 80 and cellular telephone 10 could be connected via a local area network, infrared transmitter/receiver devices, or other means. The personal computer 80 is a device familiar to those skilled in the art, and is manufactured by numerous entities such as International Business Machines Corp. and Apple Computers, Inc.

As can be seen in FIG. 1, data input to port 82 is provided to controller 50. In this embodiment of the invention, PCMCIA card 62 plugs into a corresponding PCMCIA card slot (not shown) in personal computer 80. Questions and information on PCMCIA card 62 are transferred from personal computer 80 to the display 90 on the cellular telephone 10 via connector cable 81. The user can then respond to questions and instructions provided on display 90. The transmission of the responses and signature to the system administration in the customer activation center 23 is performed by any of the methods set forth above. Further, the activation and preprogramming of the cellular telephone 10 is performed using instructions on display 90, as set forth above. This alternative embodiment of the invention is preferred when the cellular telephone 10 does not have a PCMCIA card connector or the ability to directly read another type of memory device, such as floppy disk.

Those skilled in the art will recognize that the cellular telephone 10 may not include a display 90 that allows direct user input using a stylus 92 or other device. Some cellular telephones 10 include only a numeric keypad and a few function keys. In such a cellular telephone 10, it is advantageous to use the input means and display provided in conjunction with personal computer 80 to assist in programming cellular telephone 10.

In this alternative embodiment a display 84, such as a monitor, is associated with personal computer 80 and is substituted for display 90 on cellular telephone 10. Questions and information are read by the personal computer 80 from the PCMCIA card 62 and are provided to the user on display 84. The user responds to questions and information for programming the cellular telephone 10 with user input device 86. User input device 86 may be incorporated into the display 84 as a touch sensitive screen, as was set forth with regard to display 90 in FIG. 1. Alternatively, the user input device 86 may be a conventional keyboard, or other suitable input mechanism, in conjunction with a signature capture device 96.

In view of the foregoing description of the preferred embodiment in its intended environment, other embodiments of the present invention will suggest themselves to those skilled in the art. Therefore, the scope of the present invention is to be limited only by the claims below and equivalents thereof.

We claim:

1. A cellular telephone for communications in a cellular telecommunications network of the type having a customer activation center (CAC), said cellular telephone being programmed by using a personal computer which has prompts for a user, said cellular telephone comprising:

a connector for connecting said cellular telephone to said personal computer;

a display for presenting said prompts to said user of said cellular telephone;

an input device for allowing said user to provide responses to said prompts;

a radio frequency (RF) transmitter for sending a dummy mobile identification number (MIN) and said responses to said CAC over said cellular telecommunications network;

an RF receiver for receiving said valid MIN from said CAC over said cellular telecommunications network; and a controller, connected to said personal computer through said connector, and connected to said display, said input device, said RF receiver and said RF transmitter, said controller obtaining said prompts from said personal computer, controlling presentation of said prompts via said display, accepting said responses from said input device, controlling the sending of said dummy MIN and said responses to said CAC via said cellular telecommunications network using said dummy MIN to gain access to said cellular telecommunications network, accepting said valid MIN from said CAC via said RF receiver, controlling presentation of said valid MIN to said user, and storing said valid MIN in said cellular telephone.

2. The cellular telephone of claim 1 and further comprising a memory device and wherein said memory device has said dummy MIN.

3. The cellular telephone of claim 1 wherein said personal computer contains said dummy MIN, and said controller receives said dummy MIN from said personal computer via said connector.

4. A cellular telephone for communications in a cellular telecommunications network of the type having a customer activation center (CAC), said cellular telephone being programmed by using a personal computer which has a display, said cellular telephone comprising:

a connector for connecting said cellular telephone to said personal computer;

an input device for allowing said user to provide responses to prompts;

a radio frequency (RF) transmitter for sending a dummy mobile identification number (MIN) and said responses to said CAC over said cellular telecommunications network;

an RF receiver for receiving said valid MIN from said CAC over said cellular telecommunications network; and a controller, connected to said personal computer through said connector, and connected to said input device, said RF receiver and said RF transmitter, said controller controlling presentation of said prompts via said display of said personal computer, accepting said responses from said input device, controlling the sending of said dummy MIN and said responses to said CAC via said cellular telecommunications network using said dummy MIN to gain access to said cellular telecommunications network, accepting said valid MIN from said CAC via said RF receiver, controlling presentation of said valid MIN to said user, and storing said valid MIN in said cellular telephone.

5. The cellular telephone of claim 4 and further comprising a memory device and wherein said memory device contains said dummy MIN.

6. The cellular telephone of claim 4 wherein said personal computer contains said dummy MIN, and said controller receives said dummy MIN from said personal computer via said connector.

7. A cellular telephone for communications in a cellular telecommunications network of the type having a customer activation center (CAC), said cellular telephone being programmed by using a personal computer which has input device for a user to provide responses to prompts, said cellular telephone comprising:

a connector for connecting said cellular telephone to said personal computer, a display for providing said prompts to said user of said cellular telephone;

a radio frequency (RF) transmitter for sending a dummy mobile identification number (MIN) and said responses to said CAC over said cellular telecommunications network;

an RF receiver for receiving said valid MIN from said CAC over said cellular telecommunications network; and a controller, connected to said personal computer through said connector, and connected to said display, said RF receiver and said RF transmitter, said controller controlling presentation of said prompts via said display, accepting said responses from said personal computer, controlling the sending of said dummy MIN and said responses to said CAC via cellular telecommunications network using said dummy MIN to gain access to said cellular telecommunications network, accepting said valid MIN from said CAC via said RF receiver, controlling presentation of said valid MIN to said user and storing said valid MIN in said cellular telephone.

* * * * *